METHOD AND SYSTEM FOR AUTOMATIC DETERMINATION
OF THE LOCATION OF THE FRAME LINES DIVIDING
A FILM STRIP INTO CONSECUTIVE FRAMES

Filed Feb. 27, 1967 2 Sheets-Sheet 1

INVENTOR.
HEINRICH NASSENSTEIN
HUBERT DEDDEN
RUDOLF PAULUS
Michael S. Striker
Attorney

INVENTOR.
HEINRICH NASSENSTEIN
HUBERT DEDDEN
RUDOLF PAULUS

United States Patent Office 3,469,480

Patented Sept. 30, 1969

3,469,480

METHOD AND SYSTEM FOR AUTOMATIC DETERMINATION OF THE LOCATION OF THE FRAME LINES DIVIDING A FILM STRIP INTO CONSECUTIVE FRAMES

Heinrich Nassenstein, Hegelstrasse 6, Leverkusen, Germany; Hubert Dedden, Johannisberg 39, Leichlingen, Germany; and Rudolf Paulus, Perlacher Strasse 19, Munich, Germany Filed Feb. 27, 1967, Ser. No. 618,894
Claims priority, application Germany, Feb. 25, 1966, A 51,683
Int. Cl. B26d 5/34
U.S. Cl. 83—50 29 Claims

ABSTRACT OF THE DISCLOSURE

The film is transported in a lengthwise direction from a measuring station to a marking station. The light transmissivity of the film is measured at the measuring station by measuring the light transmitted through the film. Since this transmitted light will have an extreme value at the frame lines, a computer selects the extreme value and generates a signal at its occurrence such that a punching mechanism will be activated at the marking station when the film has been advanced a distance corresponding to the distance between the two stations, unless the punching mechanism is locked because the computer has determined that the picture is unexposed.

Background of the invention

This invention relates to systems and methods for determining the location of frame lines on film strips which divide these film strips into separate frames. In particular, it relates to methods and systems in which the location of the frame lines is determined automatically.

In a known system the film strip is scanned by photoelectric means. Scanning is accomplished by a light slot parallel to the frame lines. An eletcronic system is supplied in conjunction with the photoelectric scanning system to differentiate the frame lines from the remainder of the image field. This electronic system is based on the assumption that the transmissivity curve undergoes a sharp change at the frame lines which may be determined as a high value of gradient of the transmissivity curve. For this, a threshold value of transmissivity gradient is inserted into the electronic circuitry. If this is exceeded, the circuitry is programmed to indicate that a frame line is present. However, in practice, several difficulties occur with this apparatus.

For example, for negatives, the picture edge is not always a sharp transition from a region of low transmissivity to a region of high transmissivity. There are cameras, for example, which do not have a straight line boundary between the image field and the frame line but rather, in order to minimize reflections within the camera housing, have a zig-zag type of frame line. Furthermore, when flash illuminaton is used, showing a subject in the middle of the picture in otherwise poorly lit surroundings, the edges are greatly under-illuminated and no sharp difference in transmissivity occurs at the frame line. Also it is possible that very high gradients of transmissivity occur within the frames so that a wrong indication of frame line may result. Thus, with this type of system, frame lines may be indicated when none exists, and real frame lines may be missed.

Summary of the invention

According to this invention the transmissivity of a film strip is measured over predetermined lengthwise portion of the film strip. The extreme measured value corresponding to the type of film being used is selected automatically. The film is marked at the location of said extreme value.

In this method, the frame line is not located by reaching a predetermined gradient of transmissivity, but rather as a relative extreme value occurring during the above mentioned predetermined lengthwise portion. Thus large differences in transmissivity throughout the picture can cause no errors.

Numerous measurements have shown that the location of the extreme value of transmissivity, hereinafter referred to as $X_s$, with very few exceptions is always located within a frame line. More exact localization of the picture edge may be achieved by using the so-called "gradient criterion" or other condition starting with the location $X_s$. When using the gradient criterion the first location after $X_s$ wherein the transmissivity is less extreme by a predetermined amount than the transmissivity at $X_s$ is identified as the frame line, if this location occurs within a predetermined distance S after $X_s$. When the gradient criterion cannot be fulfilled, either an unexposed picture is present or a picture with very weak illumination around the edge. The presence of an unexposed picture is indicated if within a region of length B greater than S, starting at $X_s$, there is no value of transmissivity which is less extreme than the extreme value at $X_s$ by another predetermined value. This criterion will be called the unexposed picture criterion in the following discussion. If the picture is not unexposed and the gradient criterion is not fulfilled, a picture with a very weakly illuminated edge must be present. In this case $X_s$ is considered the frame line.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Description of the preferred embodiments

Figures 1, 2:
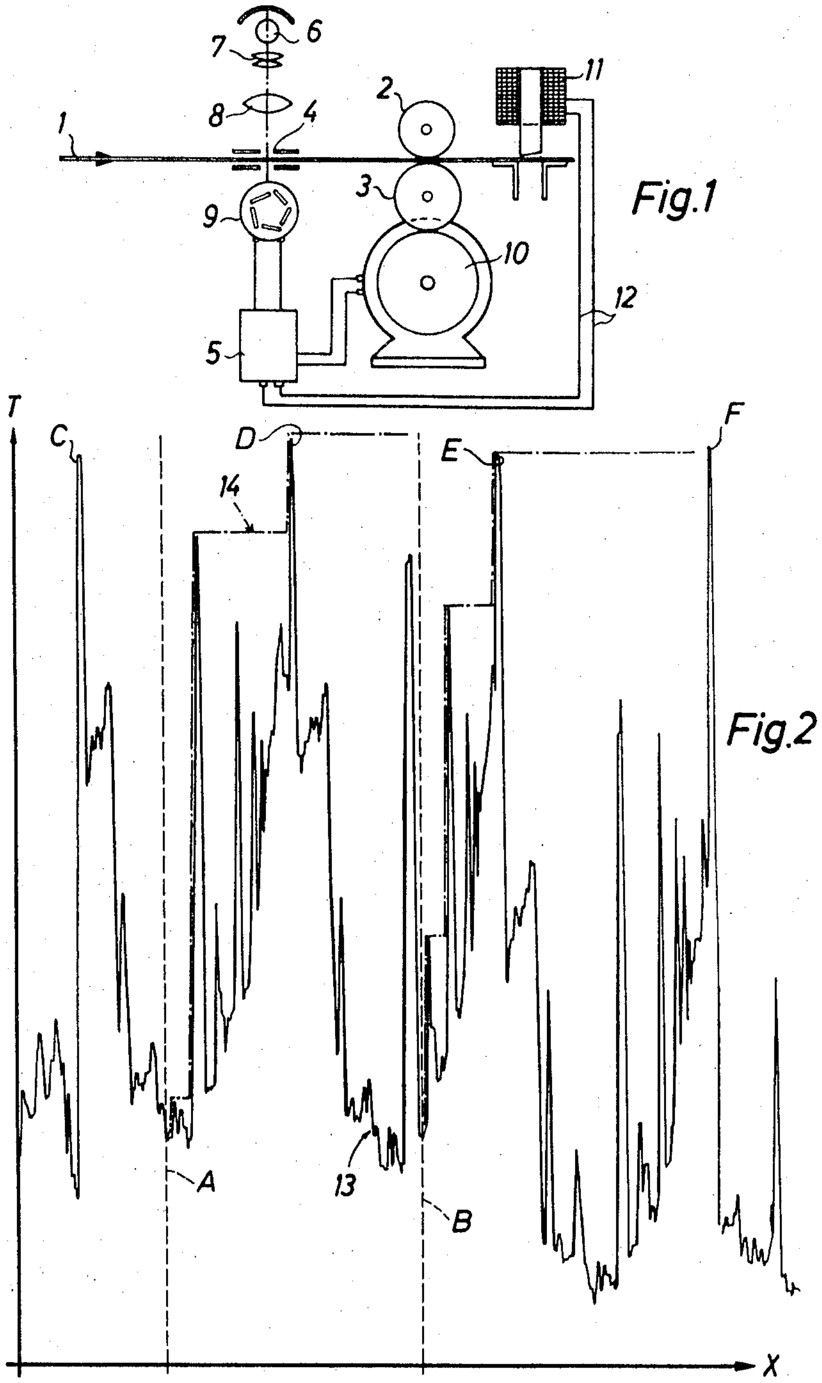
FIG. 1 shows the apparatus used for locating frame lines according to this invention.
FIG. 2 is an example of the transmissivity curve obtained from a strip of negative film.

In FIG. 1, a strip of negative film, designated 1, is moved past a slot 4 by friction rollers 2 and 3. Friction rollers 2 and 3 are driven by step motor 10, whose movements are controlled by the computer.

Light source 6, in conjunction with condenser 7 and lens 8, illuminates slot 4. The light passes through the slot and then through film 1 and inpinges amplifier 9, which is a secondary electron emission amplifier. This amplifier is connected to the computing mechanism. Arranged after scanning slot 4, in the direction of film advance, is a marking arrangement 11, which may take the form of a punch, which punches a slot into the edge of the film as soon as the command to do so is received from computing system 5 over conductor 12. This marking slot can then be used in a suitably equipped printing mechanism to position the picture correctly. The stepping motor 10 is a well known element which moves friction rollers 2 and 3, and, with them, the film 1, for a short, exact distance each time a pulse is received.

Curve 13 in FIG. 2 shows the variation of transmissivity in a negative film, that was scanned with a scanning slot parallel to the frame line. The width of the slot is at the most equal to the width of the narrowest possible frame line but is preferably only equal to about half said width. The variation of transmissivity is shown over a length corresponding to three picture frames. The frame lines are designated C, D, E, and F. For example the scanning may start at point A, and proceed to the right, and continue over lengthwise portion of film corresponding to the maximum possible width of the frame (up to point B). The dash-dot line designated 14 shows the so-called "hold function" whose value at every point is equal to the measured extreme value of transmissivity up to that point. For example in case of negative film strips this would be the highest measured transmissivity, in the case of direct positive films, the smallest measured transmissivity within the current lengthwise portion of the film strip. Starting at point A, curve 14 reaches ever increasing values, until the maximum value within the interval A to B is reached at frame line D. Naturally, the density curve could have been used as well as the transmissivity curve simply by interchanging the maximum and minimum values. The curve shown here indicates that within the separate pictures very high variations, i.e. very high gradients of transmissivity may occur.

Figure 3:
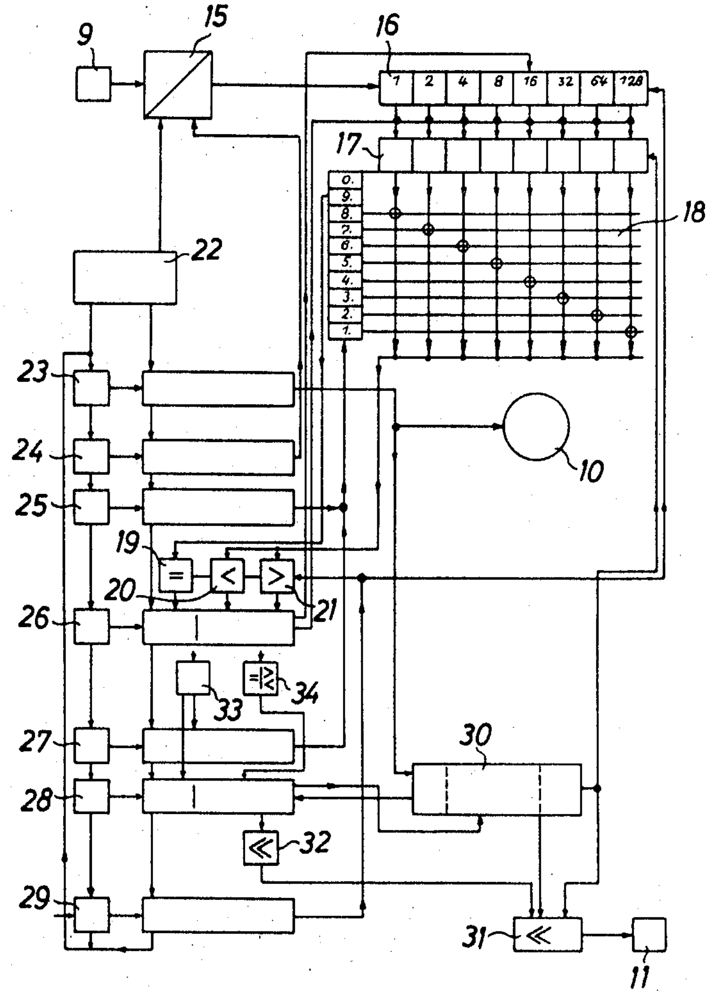
FIG. 3 is a block diagram of the computer circuitry.

FIG. 3 shows a block diagram of the computing system used to evaluate the values of transmissivity furnished by secondary electron emission amplifier 9. This evaluation can be accomplished equally well by a digital or by an analog type computing system. In the particular case here, the advantage of a digital type computing system is that the exact stored values of transmissivity will be retained even upon interruption of the cycle. However, the particular system to be used must be separately evaluated for each case. The particular embodiment shown below is a digital type computing system.

An analog-digital converter 15 is connected to amplifier 9 in order to convert the voltage values at its output into digital form. These digital numbers are conducted to register 16 in which they may be stored according to a binary number system. A second register 17 is connected to the first register 16 and has the same capacity and is capable of receiving the numbers stored in register 16. Furthermore, the two registers are connected by a comparison matrix 18, which can compare the numbers in register 16 to those in register 17, step by step. The comparison starts as the place rfepresenting the highest value and proceeds from there to the next place in such a way that after the first inequality no further comparisons take place. The result of these comparisons is stored in one of the flip-flops 19, 20 or 21. Flip-flop 19 is set if the two stored values are alike, flip-flop 20 is set if the value in register 16 is smaller than that in register 17, and flip-flop 21 is set if the value in register 16 exceeds the value in register 17.

Furthermore, the block diagram shows a timer 22 which controls program means having program steps 23, 24, 25, 26, 27, 28 and 29. These program means takes the form of a shift register, wherein each step of the register passes the command to the next step after its command has been carried out. The function of each step of the command register are detailed more exactly below.

Box 30 in the block diagram symbolizing one or two counters which count the steps of stepping motor 10. The number of counters required depends on the size of the preselected lengthwise portion of film strip. If said portion is chosen to be smaller than the width of one picture frame, the counters need only store the position of one frame line. If the interval is chosen to be larger than the length of one picture frame, more counters must be used. The count in the counters advances by one each time the step motor advances one step, but each counter may be reset separately.

Two flip-flops 33 and 34 follow step 26 of the program. Both of these, under different conditions, issue the command to skip step 27.

A locking arrangement 31 prevents the movement of punch 11 or the copying process, if an unexposed picture is found in the interval. The marking punch 11 is connected to the locking device 31.

The following describes an operating cycle in detail. The first step 23 of the program issues the order for advancement of the film by one step and simultaneously increases the number in the counter by one unit. The following program step 24 starts the converter 15 which now converts the amplitude of the incoming transmissivity value to a pulse train having a number of pulses proportional to the magnitude of the transmissivity of the film at the scanning slot. This pulse train is stored in binary code in register 16. A comparison between the value of transmissivity stored in register 16 and the value of the so-called "hold function" which is stored in register 17 as a result of previous operating cycles begins with the third program step, step 25. Starting with the highest place value, the contents of the registers are compared place by place, one to the other. This is accomplished by comparison matrix 18 which is connected with both registers. Depending on the results of this comparison, which is stored in one of the three flip-flops 19, 20 or 21, program step 26 controls the further operation of the computer.

If the present value of tranmissivity as stored in register 16 is larger than the highest value up to that time, then the value of register 16 is transferred into register 17 as a new "hold function" value, thus rebuilding the "hold function" anew in each scanning cycle. Program step 27 then is skipped and step 28 resets counter 30. (In this, and the following paragraphs, it is assumed that the "extreme" value is a maximum value.)

If the present value in register 16 is equal to the value in register 17, step 27 is skipped and depending on the state of the flip-flop 34, the counter 30 is reset or not reset by program step 28. The condition of the flip-flop indicates whether, at the last comparison which indicated inequality between the values of register 16 and 17, the then present value was larger or smaller than the "hold function" value.

If, however, the present value is smaller than the value in register 17, one must first test whether the gradient criterion can be satisfied. For this purpose step 26 effects an addition of a certain number *k* to the present value and step 27, after resetting the flip flops 19, 20 or 21, compares this higher present value and the "hold function" value as had been done by step 25. If the new comparison shows that the increased present value is still smaller than the extreme value found up to this point, then this information is stored in flip flop 32 and is used in conjunction with the step 28 to reset counter 30, if this indication that the increased value is still smaller than the extreme value stored in register 17 occurs for the first time within a counting region S. Here, the counting region S is defined as the number of steps corresponding, for example, to the maximum width of a grid line. If this indication occurs within this interval, the locking of the marking system 11 by flip flop 31 is lifted. That is, the picture currently being scanned is not unexposed, but a picture capable of being copied and the located frame line may be marked. If the new comparison shows that the increased present value is larger or equal to the value stored in register 17, then the counter 30 is not reset.

Program step 29 resets register 16 and flip flops 19, 20 and 21 and program step 23 initiates a new cycle. While the film is transported further, counter 30 contains the distance between the located frame line and the scanning station in the form of the number of transport steps.

The scanning cycle is repeated after each transport step. Since the capacity of counter 30 is equal to the number of transport steps in the scanning interval and is also equal to the distance between the marking system 11 and the scanning location, the overflow pulse of counter 30 may be used to reset the "hold function" register 17 and may also be used to start the marking system 11 if the latter is not locked by flip flop 31.

The operation of the computer after the result of the comparison in steps 25 and 26 is controlled by flip flop step 33. In question here is the command for a conditional jump step: this either connects from step 26 immediately to step 28, if the present value is larger or equal to the current "hold function" value; or it leads from step 26 over step 27 to the addition of a constant value to the present value, and by a subsequent repetition at step 25, to a comparison between the increased value and the "hold function" value, and then to step 28 if the increased present value is still smaller than the "hold function" value.

It is also possible to keep the extreme value found within a lengthwise portion of the film strip in register 17 and to compare this with the value measured by a second photoelectric scanning system. If the same value appears there as had been found as an extreme value, the frame line location has been found, and the marking element may be operated.

While the invention has been illustrated and described as embodied in a photoelectric scanning device with digital computing system, it is not intended to be limited to the details shown, since various modifications and structural changes may be made without departing in any way from the spirit of the present invention.

What is claimed as new and desired to be protected by Letters Patent is:

1. A method for determining the location of frame lines between consecutive frames on a film strip, the energy transmissivity of said film strip having an extreme value at said frame lines, comprising, in combination, the steps of measuring the energy transmissivity of said film strip along predetermined lengthwise portions of said film strip so as to determine the extreme values of transmissivity corresponding to frame lines on the film strip and the locations thereof; and creating signals in response to said extreme value of transmissivity for the purpose of locating said frame line in relation to said extreme value.

2. A method as set forth in claim 1, wherein said film strip is advanced along a predetermined lengthwise path from a first station to a second station, said measuring taking place at said first station and a subsequent processing step taking place at said second station.

3. A method as set forth in claim 2, also comprising the step of generating an activation signal for initiating said subsequent processing step when said frame line is correctly positioned in a lengthwise direction for said subsequent processing step.

4. A method as set forth in claim 2, also comprising the step of punching a mark on said film strip at the location of said frame line, in response to said activation signal.

5. A method as set forth in claim 1, wherein measuring the transmissivity through said film strip comprises measuring the transmissivity of consecutive narrow sections of said film strip which are substantially parallel to said frame lines, and generating measured transmissivity values.

6. A method as set forth in claim 5, wherein the width of said narrow sections is less than the minimum width of said frame lines and preferably equal to half said minimum width.

7. A method as set forth in claim 5, also comprising the steps of comparing, after each measuring, the last measured transmissivity value to the extreme measured transmissivity value found within the part of a predetermined lengthwise portion of said film strip preceding the narrow section being measured; storing the greater of the two; and cancelling the lesser of the two.

8. A method as set forth in claim 7, also comprising the step of generating an additional signal whenever the last measured transmissivity value is the greater of the two.

9. A method as set forth in claim 7, wherein the length of said predetermined lengthwise portion is less than the maximum width of a frame added to the maximum width of a frame line.

10. A method as set forth in claim 7, wherein the length of said predetermined lengthwise portion is at least equal to the maximum frame width added to the maximum width of a frame line, and does not exceed twice the maximum frame width added to twice the maximum width of a frame line; and wherein the measuring of transmissivity commences at the last located frame line.

11. A method as set forth in claim 8, also comprising the step of measuring, as the film is advanced, the distance between said first station and the location on said film strip corresponding to the generation of said additional signal; and generating said activation signal when said distance is equal to the distance between said first and second stations.

12. A method as set forth in claim 11, also comprising the steps of computing the gradient of transmissivity following an extreme value of transmissivity; generating a gradient signal if said gradient exceeds a predetermined value within a predetermined distance, said distance being less than the maximum width of a frame line; and restarting the distance measurement in response to said gradient signal in such a manner as to generate said activation signal when said distance between said first station and the location on the film strip corresponding to the generation of said gradient signal is equal to the distance between said first and second stations.

13. A method as set forth in claim 2, also comprising the step of generating a locking signal to prevent the subsequent processing step if no change in transmissivity exceeding a second predetermined value occurs within a second predetermined distance along said film strip, said second predetermined distance being shorter than the minimum frame width.

14. A method as set forth in claim 1, also comprising the steps of storing the extreme value of transmissivity found within a predetermined lengthwise portion of said film strip, to generate a stored extreme transmissivity value; remeasuring the energy transmissivity of said film strip; comparing the remeasured transmissivity values to said stored extreme transmissivity value; and generating an equality signal when the remeasured transmissivity value is equal to said stored extreme transmissivity value for the purpose of locating said frame line at the location corresponding to the generation of said equality signal.

15. An arrangement of the character described comprising, in combination, means for moving a film strip along a predetermined path; means for measuring the energy transmissivity of said film strip while moving along said path so as to determine the extreme values of energy transmissivity corresponding to framelines on the film strip; means for creating signals corresponding to said extreme values of transmissivity of said film strip; a film processing station arranged along said predetermined path after said measuring means; and means for actuating said processing means in dependency upon said signals corresponding to said extreme values of transmissivity.

16. A system as set forth in claim 15, wherein said means for moving a film strip comprise friction rollers adapted to advance said film in a lengthwise direction; and a motor to drive said friction rollers.

17. A system as set forth in claim 15, wherein said means for measuring the energy transmissivity of said film strip comprise photoelectric means for measuring the light transmissivity of consecutive narrow sectors of said film strip and generating measured transmissivity values.

18. A system as set forth in claim 16, also comprising computing means responsive to said measured transmissivity values and adapted to generate a computer signal at the extreme value of said transmissivity.

19. A system as set forth in claim 18, wherein said computing means comprise digital computing means.

20. A system as set forth in claim 19, also comprising analog-digital converting means for converting said measured transmissivity values to digitally coded transmissivity values.

21. A system as set forth in claim 19, wherein said digital computing means comprise a first register adapted to store the last measured digitally coded transmissivity value; a second register adapted to store the extreme digitally coded transmissivity value measured within a predetermined lengthwise portion of said film strip; means for comparing the contents of said first and second register and generating said computer signal when the contents of said first register represent a more extreme value than the contents of said second register; and transfer means responsive to said first computer signal and adapted to transfer the contents of said first register to said second register.

22. A system as set forth in claim 18, also comprising additional computing means responsive to said computer signal, adapted to measure the distance, as the film is moved, between the location on said film strip corresponding to the generation of said computer signal and said measuring means, and further adapted to generate in activation signal in such a manner as to activate said processing means when said distance is equal to the distance between said measuring means and said processing means.

23. A system as set forth in claim 22, wherein said additional computing means comprise digital computing means.

24. A system as set forth in claim 23, wherein said motor is a step-motor.

25. A system as set forth in claim 24, wherein said second computing means comprise a counter having a capacity equal to the number of motor steps required to advance said film strip from said measuring means to said processing means.

26. A system as set forth in claim 25, wherein the capacity of said counter corresponds to a distance somewhat smaller than the minimum frame width.

27. A system as set forth in claim 26, also comprising programming means adapted to control the operation of said motor and said computing means according to a predetermined sequence of operations.

28. A system as set forth in claim 27, wherein said programming means comprise a shift register, adapted to shift automatically to a following operating step upon completion of a previous operating step, and in dependence on the result thereof.

29. A system as set forth in claim 15, wherein said processing means comprise means for punching a mark on said film strip at the location of said frame line.

References Cited

UNITED STATES PATENTS

| | | | |
|---|---|---|---|
| 2,838,113 | 6/1958 | Cornell | 83—365 |
| 3,202,042 | 8/1963 | Jamieson et al. | 250—219 |

OTHER REFERENCES

Dym, H., IBM Technical Disclosure Bulletin, vol. 8, No. 1, June 1965, pp. 121–122.

JAMES M. MEISTER, Primary Examiner

U.S. Cl. X.R.

83—365, 371; 250—219